No. 850,211. PATENTED APR. 16, 1907.
F. E. CASE.
AUTOMATIC MOTOR CUT-OUT.
APPLICATION FILED JULY 18, 1906.
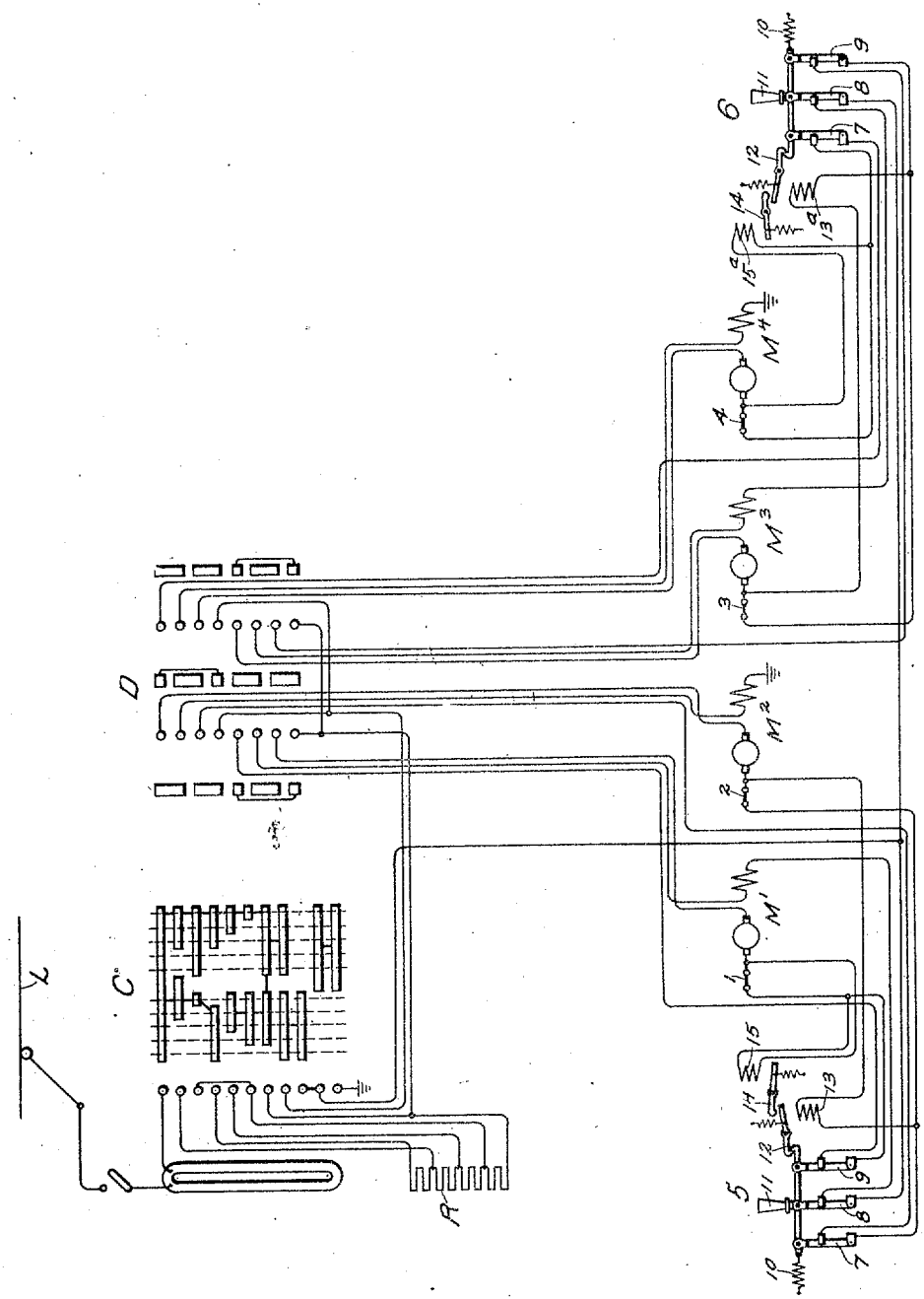
Witnesses:
Inventor;
Frank E. Case
By Albert G. Davis
Att'y.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

AUTOMATIC MOTOR CUT-OUT

No. 850,211.      Specification of Letters Patent.      Patented April 16, 1907.

Application filed July 18, 1906. Serial No. 326,708.

*To all whom it may concern:*

Be it known that I, FRANK E. CASE, a citizen of the United States, residing at Schenectady, in the county of Schenectady and State of New York, have invented certain new and useful Improvements in Automatic Motor Cut-Outs, of which the following is a specification.

It is usual in four-motor car or locomotive equipments to connect the motors in two permanent groups, each containing two motors in parallel. In starting the car or locomotive these two groups are first connected in series and then in parallel. When individual fuses are used for the different motors in such equipments, the blowing of the fuse of one motor will cut out that motor alone, thus giving rise to a condition wherein in starting and while the controller is in the series positions a single motor is connected in series with two motors arranged in parallel, making it necessary for the motorman to remove another fuse or otherwise change the circuit connections so as to cut out the corresponding motor of the other group. This operation of course involves time, and if neglected causes trouble.

The object of the present invention is to provide means whereby in a system in character described the blowing of the fuse of one motor automatically effects the cutting out of the corresponding motor of the other group or groups.

In the accompanying drawings I have shown diagrammatically a four-motor-car equipment having associated therewith a well-known type of controller and cut-out devices arranged in accordance with the present invention.

Reference being had to the drawings, $M'$ $M^2$ $M^3$ $M^4$ indicate the four motors. C is a controller for connecting the motors with source of supply L in two groups, consisting, respectively, of motors $M'$ $M^3$ and $M^2$ $M^4$, connected first in series and then in parallel and for varying the amount of resistance R in circuit with the motors. D is a reversing-switch for changing the relative connections of the field and armature windings in order to produce reversal of the motors. These elements may take any usual or desired forms, the particular forms illustrated being simply indicative of apparatus ordinarily used.

1, 2, 3, and 4 are fuses arranged in the circuits of the motors $M'$, $M^2$, $M^3$, and $M^4$, respectively. 5 and 6 are cut-out switches, switch 5 being adapted to open the circuit of motors $M'$ and $M^2$, and switch 6 being adapted to open circuit of motor $M^3$ and $M^4$. Thus when one of the cut-outs is open corresponding motors in the groups are eliminated, the two remaining motors being then connected in series and in parallel by turning the controller in the normal way. These cut-out switches are illustrated as each having three poles 7, 8, and 9, and as being provided with a spring 10, which tends to hold the switch open normally. After the switch has been closed—as, for example, by means of handle 11—it is held closed by a catch 12.

Referring to switch 5, 13 is an electromagnet in shunt to fuse 2, so that when this fuse blows the motor-current passes through coil of the electromagnet and releases the catch. The spring then opens the switch and the circuits of both motors $M'$ and $M^2$ are interrupted. 14 is a tripping device for catch 12, controlled by an electromagnet 15, the coil of this electromagnet being shunt to the fuse 1, so that when this fuse blows the catch will be tripped and the cut-out switch opened, eliminating motors $M'$ and $M^2$, as before. The controlling means for switch 6 is the same as that for the other switch, the coils $13^a$ and $15^a$ being in this case in shunt to fuses 3 and 4, respectively. The blowing of either of these fuses effects the opening of the cut-out switch 6 in the same manner that the other switch is opened upon the blowing of fuses 1 or 2.

It will of course be understood that my invention is not limited to the particular form of cut-out switch or controlling means therefor shown, since these devices may be changed in various ways without departing from the scope of my invention.

What I claim as new, and desire to secure by Letters Patent of the United States, is—

1. In a motor-control system, a plurality of groups of motors, an automatic cut-out device associated with each of the motors, and means controlled by said devices for cutting out corresponding motors from said groups upon the operation of one of said devices.

2. In a motor-control system, a plurality of groups of motors, a fuse in the circuit of each motor, and means for automatically disconnecting corresponding motors from said groups when one of the fuses blows.

3. In a motor-control system, a plurality of groups of motors, cut-out switches for said motors, fuses in the motor-circuits, and means for operating said switches to cut out corresponding motors from said groups when one of the fuses blows.

4. In a motor-control system, a plurality of groups of motors, fuses in the motor-circuits, and means for cutting out corresponding motors from said groups when any one of the fuses blows.

5. In a motor-control system, a plurality of groups of motors, an automatic cut-out device associated with each motor for opening the circuit thereof, an electroresponsive device in shunt to each of said cut-out devices, and means controlled by each of said electroresponsive devices for cutting out corresponding motors from said groups upon the operation of one of said cut-out devices.

6. In a motor-control system, a plurality of groups of motors, a fuse in the circuit of each motor, cut-out switch mechanisms arranged to cut out corresponding motors from said groups and electroresponsive devices arranged in shunt to said fuses for causing the operation of one of the cut-out switch mechanisms upon the blowing of the fuse in the circuit of one of the motors affected by said latter switch mechanism.

7. In a motor-control system, a plurality of groups of motors each comprising a plurality of motors connected in parallel, motor-control apparatus arranged to connect said groups in series and in parallel, fuses in the motor-circuits, and means for automatically cutting out corresponding motors from said groups when one of the fuses blows.

8. In a motor-control system, a plurality of groups of motors each comprising a plurality of motors connected in parallel, motor-control apparatus arranged to connect said groups in series and in parallel, a fuse in the circuit of each motor, switch mechanisms arranged to cut out corresponding motors from said groups, and an electroresponsive device in shunt to each of said fuses arranged to cause the operation of one of said switch mechanisms upon the blowing of a fuse associated with one of the motors controlled by the latter switch mechanism.

In witness whereof I have hereunto set my hand this 17th day of July, 1906.

FRANK E. CASE.

Witnesses:
BENJAMIN B. HULL.
HELEN ORFORD.